United States Patent Office 3,707,398
Patented Dec. 26, 1972

3,707,398
METHOD OF PREPARING A PRE-COAT FILTER
David Charlesworth, Vernham Dean, England, assignor to Stella-Meta Filters Limited, Laverstoke, near Whitchurch, Hampshire, England
No Drawing. Filed Mar. 8, 1971, Ser. No. 122,172
Claims priority, application Great Britain, Mar. 6, 1970, 10,968/70, 11,458/70
Int. Cl. B01d *37/02;* B44d *1/16*
U.S. Cl. 117—72         9 Claims

ABSTRACT OF THE DISCLOSURE

The invention provides a method of preparing a pre-coat filter for use in applications where silica-containing filter media cannot be employed. In the method a pre-coat filter is provided with a first layer of a finely-divided non-fibrous inert material and a second layer of a fibrous filter medium. In operation of the filter the non-fibrous inert material prevents fouling of the filter by the fibrous filter medium.

---

The present invention relates to the filtration of liquids, in particular to the filtration of liquids using pre-coat filters.

Pre-coat filters are widely used in, for example, water treatment, in the chemical industry and in the brewing industry, and comprise a filter bed of a suitable filter medium formed on a liquid permeable support by passing a suspension of the medium through the support prior to filtration. The support may be of the "Candle" or "Leaf" type, the former including tubular elements surrounded by bindings of fine wire e.g. of the type known as a "Stellar" filter, a series of close packed filter rings encircling a drainage element e.g. of the type known as a "Meta" filter, and sintered candles, and the latter comprising flat leaf elements surrounded by fine wire mesh.

The material most commonly used as a filter medium in pre-coat filters is diatomaceous earth, but under certain conditions e.g. where the liquid to be filtered has a high or low pH, this material is not a suitable pre-coat because of its siliceous nature. Typically, in water treatment for high-pressure boilers, silica-containing materials may not be used, and the universally accepted pre-coat material is cellulose in the form of fibres so small as to appear to be powder, a typical material being sold under the trademark "Solkafloc."

Pre-coat filters are periodically cleaned by backwashing, a fresh pre-coat being thereafter applied. In practice it has been found that where cellulose or other fibres are used some of the fibres tend to become fixed to the support and when the filters are backwashed these trapped fibres are not removed with the result that the filters become progressively more difficult to clean and recoating consequently becomes increasingly uneven. The filters then give high headlosses, coupled with poor filtration. When headlosses reach an unacceptable value it is necessary to dismantle the filters to clean them.

The problem of increasing the period before dismantling or even of eliminating the need for dismantling, is of long standing and has been the subject of much investigation.

We have now found that fouling of a filter support by a fibrous filter medium can be avoided by the use of a layer of finely-divided non-fibrous inert material between the support and the filter medium.

Accordingly, the present invention provides a method of preparing a pre-coat filter, which method comprises forming a suspension of a finely-divided non-fibrous inert material containing a majority of particles which are incapable of passing through the apertures of a liquid permeable filter support, passing the suspension through the filter support to coat the support with a layer of the non-fibrous inert material and thereafter passing a suspension of a fibrous filter medium through the support to coat the layer of non-fibrous inert material with a layer of the fibrous filter medium.

The non-fibrous inert material used to provide the first layer on the support may be any material obtainable in a finely-divided form which has little or no affinity for the suspended matter to be removed from the liquid to be filtered, that is to say the non-fibrous inert material should be substantially a non-filtering material. At the same time the non-fibrous inert material should be sufficiently compatible with the liquid to be filtered so as to be capable of forming and/or remaining as a pre-coat layer in the presence of that liquid. For example, where water is the liquid to be filtered the non-fibrous inert material should not exhibit pronounced hydrophobic properties. In addition the non-fibrous inert material must, of course, be capable of preventing the fibrous filter medium from reaching the filter.

In order to form a pre-coat layer with a finely-divided non-fibrous inert material in accordance with the invention without undue wastage and in order to provide a layer capable of preventing the fibrous filter medium from reaching the filter the particle size of the material should be such that only a minimum amount of the material can pass through the apertures of the permeable support i.e. at least a majority of the particles should be incapable of passing through the apertures of the support. As is well known these apertures vary according to the type of support employed, typical examples being as follows:

"Meta" filter—gap size 75 to 140 microns
"Stellar" filter—gap size typically 75 microns
Sintered candle—pore size minimum 20 to 30 microns, typically 50 microns.

It will be appreciated, therefore, that in general the non-fibrous inert material will have a particle size of at least 25 microns, and usually no more than 250 microns, typically 50 to 250 microns. Preferably the non-fibrous inert material consists of particles all or substantially all of which are no larger than 250 microns but no smaller than 150 microns in size, that is to say for practical purposes will pass through a 60 but be retained by a 100 BS mesh sieve.

Suitable non-fibrous inert materials for use in the method of the invention include hydrocarbon materials, typically hydrocarbon polymers such as polystyrene; other polymers such as nylon and phenol-formaldehyde; and carbon. Of these materials polystyrene is preferred, and the polystyrene may be either cross-linked or linear. Polystyrene and phenol-formaldehyde may conveniently be used in the form of beads, while nylon and carbon may conveniently be used in the form of powder. If necessary polystyrene, carbon and other materials which possess hydrophobic properties may be subjected to a surface treatment to provide them with sufficient compatibility with water.

A suitable polystyrene is that produced in the form of spherical beads and sold under the trademark "Pontybonds." This material can comprise graded beads of a specific size, for example, 25 microns, 90 microns or 150 microns or beads with particle sizes ranging, for example, from 50 to 250 microns. Preferably the polystyrene consists of beads all or substantially all of which are no larger than 250 microns but no smaller than 150 microns.

The non-fibrous inert material will in general be coated onto the support in an amount which provides a layer $\frac{1}{16}$ inch thick, that is to say usually in an amount of at least 0.15 lb./sq. ft. e.g. 0.15 to 0.5 lb./sq. ft. Preferably the fibrous filter medium consists of cellulose fibres although other media such as asbestos fibres may be used if desired. The layer of fibrous filter medium will in general be at least 1/16 inch thick, that is to say where cellulose fibres are used amounts of from 0.15 to 0.2 lb./sq. ft., may be employed. It is generally preferred that the layer of non-fibrous inert material be thinner than the layer of fibrous filter medium. For example, where the layer of non-fibrous inert material is 1/16 inch thick the layer of fibrous filter medium may be 1/8 inch thick.

It will be appreciated from the description above that pre-coat filters prepared by the method of the invention are particularly useful in the filtration of materials where silica-containing filter media such as diatomite cannot be used. For example, the pre-coat filters are particularly useful in the filtration of materials having a high or a low pH.

On the other hand for certain applications such as the filtration of beer where a finely-powdered filter medium such as diatomite is usually employed, the use of a first layer of hydrocarbon material, typically polystyrene, and a layer of fibrous filter medium in accordance with a preferred aspect of the invention in combination with a top layer of a finely-powdered filter medium has the advantage of preventing migration of the powdered filter medium into the filtrate which is the main drawback of using a powdered filter medium alone in such applications. In such applications from 0.15 to 0.3 lb./sq. ft. of the powdered medium may be employed.

By the use of a finely-divided non-fibrous inert material in accordance with the invention it is possible to continually and repetitively clean a filter element employing a fibrous filter medium to such a degree that further pre-coats can be applied in an even manner.

The invention includes a method of removing suspended matter from liquids by filtration by the use of a pre-coat filter prepared by the method of the invention.

Following is a description by way of example of the use of pre-coat filters in accordance with the invention, including a comparison with a conventional filter.

EXAMPLE 1

A candle filter of the wire wound "Stellar" type was coated with "Solkafloc" fibres to a thickness of 1/8 inch in the conventional manner. The filter was operated at 120 gallons/sq. ft./hour to treat power station boiler water containing a maximum of 1 p.p.m. of suspended iron oxide. At the start of the first run the filter gave an initial headloss with the clean pre-coat of 1 to 2 p.s.i., but on successive runs after cleaning and recoating the filter exhibited progressively increasing headlosses with clean pre-coats until after five runs the headloss reached the value of 15 p.s.i. at which stage it was necessary to remove the filter for cleaning to remove cellulose fibres fouling the filter.

When the cleaned filter was reassembled it was coated with a first layer about 1/16 inch thick of spherical cross-linked polystyrene beads having a size of from 150 to 250 microns as sold under the trademark "Pontybond," and a second layer of "Solkafloc" fibres 1/8 inch thick. The filter was again operated at 120 gallons/sq. ft./hour to treat power station boiler water containing a maximum of 1 p.p.m. of suspended iron oxide and on each successive run the filter was found not to exhibit unacceptable headlosses (i.e. 15 p.s.i. or greater over an extended period of time (greater than 6 months). During the first 6 months of use an examination of the filter showed that little or no fouling by cellulose fibres was occurring.

EXAMPLE 2

A candle filter of the wire wound "Stellar" type having a diameter of 2 inches and an effective length of 38.5 inches was tested in an experimental rig.

A quantity (0.37 lb. i.e. 0.2 lb./sq. ft. of effective filter area) of cellulose powder pre-coating material ("Solkafloc") was deposited in an even layer of uniform thickness on the outside of the filter support by circulating a suspension of the powder in demineralised water through the filter.

An artificial contaminant in the form of ferric hydroxide produced by precipitating ferric ammonium sulphate in demineralised water buffered to pH 8–9, was added in controlled doses to water recirculating through the filter at 370 gallons per hour (i.e. 200 gallons per hour per sq./ft. of effective filter area) such that iron (Fe) at a level of 1.5 p.p.m. by weight was fed to the filter.

A series of runs were carried out, each being terminated when sufficient contamination had been added to increase the pressure headloss over the filter to 15 lb./sq. in. The filter was then cleaned by the high velocity back-washing process known as "Autopacting" and flushed with clean water at approximately 100 gallons/hour/ft.$^2$. This cleaning was repeated once each time.

During the test program there was no marked difference in the time taken to reach the pressure headloss limit for each run but there was a progressive deterioration, in the quality of each successive pre-coat (as determined by visual examination) and after 12 runs the condition of the support was such that manual cleaning was necessary. By that time the filter was failing to pre-coat, notably at the top, due to fouling by iron and cellulose powder from previous runs and the pre-coat in other areas was uneven.

The program was then repeated as follows:

The filter was coated with 0.275 lb. (0.15 lb./ft.$^2$ filter area) of beads as described in Example 1 and then with 0.37 lb. of cellulose powder ("Solkafloc") such that the beads formed a barrier between the metal filter support and the cellulose powder, which was stable only while water was flowing through the filter system and holding the beads against the filter support.

The test program was then conducted in an identical manner to that described above when beads were not used.

At the end of 12 successive runs the filter support was in a clean condition and there was no deterioration in the quality of the pre-coat.

It was thus concluded that the beads had formed an effective barrier at the surface of the filter support. This barrier prevented the fibrous cellulose powder, which when mixed with ferric hydroxide has a clogging nature, from fouling the filter support. In this manner frequent manual cleaning operations were avoided.

Similar results to those set out in the above examples can also be obtained when using phenol-formaldehyde beads, carbon powder and nylon powder as the non-fibrous inert material, and when using asbestos as the fibrous filter medium.

I claim:

1. A method of preparing a pre-coat filter on a liquid permeable filter support, which method comprises forming a suspension in a liquid of a finely-divided non-fibrous inert material selected from the group consisting of polystyrene, phenol-formaldehyde, nylon and carbon containing a majority of particles which are incapable of passing through the apertures of the filter support and which have a size of at least 25 microns, passing the suspension through the support to coat the support with a layer of the non-fibrous inert material and thereafter passing a suspension in a liquid of a fibrous filter medium selected from the group consisting of cellulose powder and asbestos through the support to coat the layer of non-fibrous inert material with a layer of the fibrous filter medium.

2. A method as claimed in claim 1, wherein the non-fibrous inert material is polystyrene.

3. A method as claimed in claim 1, wherein the non-fibrous inert material consists of spherical polystyrene beads.

4. A method as claimed in claim 1, wherein the non-fibrous inert material has a particle size of from 50 to 250 microns.

5. A method as claimed in claim 1, wherein the non-fibrous inert material consists of particles at least substantially all of which are no larger than 250 microns but no smaller than 150 microns in size.

6. A method as claimed in claim 1, wherein the layer of non-fibrous inert material is 1/16 inch thick.

7. A method as claimed in claim 1, wherein the fibrous filter medium is cellulose powder.

8. A method as claimed in claim 1, wherein the layer of fibrous filter medium is 1/8 inch thick.

9. A method as claimed in claim 1, wherein the non-fibrous inert material consists of spherical cross-linked polystyrene beads all or at least substantially all of which are no larger than 250 microns but no smaller than 150 microns in size and the fibrous filter medium is cellulose powder.

References Cited
UNITED STATES PATENTS

| | | | |
|---|---|---|---|
| 3,102,836 | 9/1963 | Griswold | 162—124 X |
| 2,205,331 | 6/1940 | Alton | 210—75 |
| 3,080,971 | 3/1963 | Hutto et al. | 210—75 |
| 3,178,021 | 4/1965 | Bray | 210—75 X |
| 3,274,103 | 9/1966 | Adams | 210—75 X |

RALPH HUSACK, Primary Examiner

U.S. Cl X.R.

117—75, 98, 99; 210—75